(12) United States Patent
Jurca (10) Patent No.: US 10,213,869 B2
(45) Date of Patent: Feb. 26, 2019

(54) LASER MACHINING APPARATUS WITH ADAPTIVE MIRROR

(71) Applicant: LT-Ultra Precision Technology GmbH, Herdwangen-Schoenach (DE)

(72) Inventor: Marius Jurca, Eching (DE)

(73) Assignee: LT-ULTRA PRECISION TECHNOLOGY GMBH, Herdwangen-Schoenach (DE)

( * ) Notice: Subject to any disclaimer, the term of this patent is extended or adjusted under 35 U.S.C. 154(b) by 932 days.

(21) Appl. No.: 14/282,713

(22) Filed: May 20, 2014

(65) Prior Publication Data

US 2014/0346155 A1    Nov. 27, 2014

(30) Foreign Application Priority Data

May 21, 2013  (DE) ........................ 10 2013 008 647

(51) Int. Cl.
| | |
|---|---|
| *B23K 26/06* | (2014.01) |
| *B23K 26/03* | (2006.01) |
| *B23K 26/046* | (2014.01) |

(52) U.S. Cl.
CPC .......... *B23K 26/032* (2013.01); *B23K 26/046* (2013.01); *B23K 26/0643* (2013.01)

(58) Field of Classification Search
CPC .. B23K 26/046; B23K 26/0643; B23K 26/38; B23K 26/0665; B23K 26/064
USPC .......................... 219/121.74, 121.67, 121.78
See application file for complete search history.

(56) References Cited

U.S. PATENT DOCUMENTS

| | | | | | |
|---|---|---|---|---|---|
| 4,119,366 | A | * | 10/1978 | Lemaitre ............ | G02B 26/0825 359/847 |
| 4,812,613 | A | * | 3/1989 | Gorisch .................. | A61F 9/008 219/121.74 |
| 5,020,895 | A | * | 6/1991 | Giesen ................. | G02B 7/1815 359/845 |
| 5,667,707 | A | * | 9/1997 | Klingel ................ | B23K 26/046 219/121.67 |
| 5,754,219 | A | * | 5/1998 | Ruckl .................. | B23K 26/032 347/256 |

(Continued)

FOREIGN PATENT DOCUMENTS

| | | |
|---|---|---|
| DE | 3900467 | 7/1990 |
| DE | 19725353 | 12/1998 |

(Continued)

*Primary Examiner* — Dana Ross
*Assistant Examiner* — Lawrence Samuels
(74) *Attorney, Agent, or Firm* — Lempia Summerfield Katz LLC (57) ABSTRACT

A laser machining apparatus comprises a laser radiation source that generates laser radiation. A first and a second adaptive mirror are provided each having a pressure chamber connected to a pressure source and a mirror substrate that bounds the pressure chamber. An internal pressure in the pressure chamber can be changed with the aid of the pressure source in such a way that the mirror substrate deforms if the internal pressure in the pressure chamber changes. The mirror substrate of the first adaptive mirror has a thickness which varies at least within a region of the mirror substrate that bounds the pressure chamber. The mirror substrate of the second adaptive mirror has a thickness which is constant over the entire region over which the mirror substrate is deformable.

5 Claims, 6 Drawing Sheets

(56) References Cited

U.S. PATENT DOCUMENTS

| | | | |
|---|---|---|---|
| 5,760,366 A * | 6/1998 | Haruta | C23C 14/022 219/121.68 |
| 6,353,203 B1 * | 3/2002 | Hokodate | B23K 26/032 219/121.67 |
| 6,447,125 B1 | 9/2002 | Huonker et al. | |
| 6,504,130 B1 * | 1/2003 | Okada | B23K 26/06 219/121.72 |
| 7,102,806 B2 | 9/2006 | Boettcher | G02B 26/0825 359/224.1 |
| 8,079,721 B2 | 12/2011 | Hammann | |
| 8,450,639 B2 * | 5/2013 | Reitemeyer | B23K 26/046 219/121.67 |
| 8,878,096 B2 * | 11/2014 | Jurca | B23K 26/046 219/121.81 |
| 2001/0008469 A1 * | 7/2001 | Bar | B23K 26/0643 359/846 |
| 2005/0002078 A1 * | 1/2005 | Boettcher | G02B 26/0825 359/224.1 |
| 2005/0247682 A1 * | 11/2005 | Kuroiwa | B23K 26/0604 219/121.73 |
| 2008/0088924 A1 * | 4/2008 | Weick | B23K 26/0648 359/485.07 |
| 2008/0151399 A1 * | 6/2008 | Hammann | B23K 26/0643 359/846 |
| 2008/0259425 A1 * | 10/2008 | Boettcher | B23K 26/0643 359/201.1 |
| 2010/0276403 A1 * | 11/2010 | Reitemeyer | B23K 26/046 219/121.67 |
| 2011/0108533 A1 * | 5/2011 | Boettcher | B23K 26/043 219/121.72 |
| 2012/0083771 A1 * | 4/2012 | Warm | A61F 9/00836 606/4 |
| 2013/0001208 A1 * | 1/2013 | Jurca | B23K 26/046 219/121.83 |
| 2013/0341309 A1 * | 12/2013 | Yamamoto | B23K 26/046 219/121.61 |
| 2014/0347655 A1 * | 11/2014 | Jurca | G01M 11/0207 356/125 |

FOREIGN PATENT DOCUMENTS

| | | | |
|---|---|---|---|
| DE | 102009059245 | 6/2011 | |
| DE | 102011054941 | 1/2013 | |
| DE | 102011054941 B3 * | 1/2013 | G02B 7/008 |
| EP | 1716962 | 11/2006 | |
| EP | 2216129 | 8/2010 | |
| JP | S61137693 | 6/1986 | |
| JP | H02204701 | 8/1990 | |
| JP | H09293915 | 11/1997 | |
| WO | WO2007000171 | 1/2007 | |

* cited by examiner

LASER MACHINING APPARATUS WITH ADAPTIVE MIRROR

CROSS-REFERENCE TO RELATED APPLICATIONS

This application claims benefit of German patent application Ser. No. 102013008647.7 filed May 21, 2013. The full disclosure of this earlier application is incorporated herein by reference.

BACKGROUND OF THE INVENTION

1. Field of the Invention

The invention relates to a laser machining apparatus with which workpieces can be welded, cut, or machined in some other way and which contains an adaptive mirror. The invention further relates to a process for compensating displacements of a focal spot in such a laser machining apparatus.

2. Description of Related Art

Laser machining apparatuses ordinarily include a laser radiation source which may be, for example, a Nd:YAG laser, a fibre laser, a disk laser or a $CO_2$ laser. A laser machining apparatus further includes a machining head, which focuses the laser radiation generated by the laser radiation source in a focal spot, and a beam-feeding device which feeds the laser radiation generated by the laser radiation source to the machining head. The beam-feeding device may in this case include optical fibres or other light guides and/or one or more deflecting mirrors with plane or curved surfaces. The machining head may have been fastened to a mobile robot arm, whereas the laser radiation source is located outside the robot.

For the purpose of focusing the laser radiation in a focal spot, as a rule the machining head contains focusing optics. The latter include, besides lenses and/or mirrors, also one or more interchangeable protective discs which protect the sensitive optical elements of the focusing optics against contamination. The contamination may, in particular, be caused by splashes of material arising at the machining point or by smoke.

Above all when the laser radiation has a relatively low beam quality, as a rule it is fed to the machining head as a collimated beam with a relatively large diameter (50 mm to 100 mm). Laser radiation with higher beam quality, such as is generated, in particular, by fibre lasers and disk lasers, can also be fed to the machining head via an optical fibre. At a fibre plug the laser radiation emerges with relatively little divergence and is then collimated by a collimating lens in such a way that a beam with a $1/e^2$ diameter from about 15 mm to 25 mm arises.

Above all in the last-mentioned case, i.e. in the case of lasers with high power and good beam quality, locally very high intensities appear in the focusing optics. Particularly when the focusing optics contain lenses and other refractive optical elements such as protective discs, the unavoidable residual absorption in the lens materials that are used has the result that the elements heat up. This is accompanied by a change of shape as a consequence of the thermal expansion. In this way, even protective discs, which at room temperature act optically as a plane-parallel plate, may have a collecting action after the heating.

By virtue of the heating, the refractive power of the optical elements in question consequently changes, which has an effect on the shape and, above all, on the axial position of the focal spot generated by the focusing optics.

Measurements have shown that the focal spot, particularly in the start-up phase, i.e. after the start of the laser machining, is displaced by several millimetres (typically 5 mm to 15 mm, depending on the focal length) in the axial direction. The temporal progression and the final value of the displacement depend on the beam power, on the beam quality and on the thermal properties of the optical components. Only when after several seconds or even several minutes a steady state has been attained, in which the distribution of heat in the optical elements of the focusing optics no longer changes appreciably, does the position of the focal spot remain constant to some extent.

By virtue of the unintended displacement of the focal spot, the workpieces may no longer be machined in the desired manner. If the workpiece is located outside the focal spot, the requisite energy densities for fusing metals, for example, are no longer attained, leading to the interruption of cutting procedures and, in the case of welding, to seam defects.

It is in fact known in the state of the art to monitor the machining region on the workpiece with the aid of individual sensors or cameras. However, as a consequence of the strong emissions of light in the region of interaction with the laser radiation it is difficult to register, unambiguously and in real time, changes of position of the focal spot with the requisite accuracy and independently of the machining process, and thereby to avoid machining defects.

Even when the focusing optics contain mirrors for focusing instead of lenses, changes of position of the focal spot may occur, particularly in the start-up phase. A (to begin with, small) portion of the laser radiation is not reflected by the reflecting coating of the mirror but penetrates into said coating and the underlying mirror substrate, which, for example, may consist of glass or copper, and is absorbed there. As in the case of lenses, the heating of the reflecting coating leads to a detuning of the layered system, which results in an increased absorption. Also in the case of mirrors the focal length is shortened, but much more quickly and much less than in the case of transmissive optical components, since the thermal conductivity of the mirror materials that are ordinarily used (e.g. copper) is very high. Besides the axial displacement of the focal spot, the high-energy laser radiation can also induce other imaging errors in the optical elements of the focusing optics. Such imaging errors may lead to a blurring of the focal spot, which likewise has a disadvantageous effect on the quality of the machining.

In order to be able to keep the location and the shape of the focal spot constant during operation of the laser machining apparatus, on the one hand the changes in the focal spot have to be registered metrologically. In a second step, optical elements have to be relocated in such a way that they compensate the thermally induced changes in the focusing optics.

For the purpose of registering changes in the focal spot, it is known to direct measuring light, which may also be outcoupled laser radiation, onto the focusing optics and subsequently to register it with light sensors.

From JP S61-137693 A, for example, a refractive-power-measuring device for a laser machining apparatus is known, wherein a source of measuring light directs a collimated beam of measuring light via a plane deflecting mirror onto a converging lens of focusing optics. After passing through the converging lens the measuring light is focused in a focal plane of the converging lens, in which a point diaphragm has been arranged. Downstream of the pinhole diaphragm a light sensor has been arranged which registers the intensity of the measuring light that has passed through the pinhole diaphragm. If as a consequence of a heating of the converging lens the focal length thereof changes, the quantity of light registered by the sensor decreases. The axial positions of the pinhole diaphragm and of the converging lens are repositioned in a manner depending on the sensor signals. Since the respective position of the focal point at which the measuring light is focused always has to be sought anew in the event of a change in the focal length of the converging lens, the control system reacts relatively sluggishly.

From JP H02-204701 A a system is known with which the shape of a mirror that has been exposed to a laser beam can be kept constant independently of the thermal loading thereof. For this purpose, measuring light that was reflected from a specular surface is registered by a photodetector. Depending on the measuring signals, piezoelectric elements that have been fastened on the reverse side of the mirror are driven in such a way that they cancel a thermal change of shape registered by the measuring light.

From EP 2 216 129 A1 a laser machining head is known with integrated sensor device for monitoring the focal position. In the machining head a small portion of the laser radiation is coupled out of the collimated beam path between two converging lenses with the aid of a beam splitter and is coupled obliquely into the beam path via a collecting mirror in such a way that it passes through one of the two converging lenses of the focusing optics and an adjacently arranged protective disc. The collecting action of said mirror and of the converging lens has been established in such a way that the portion of the laser radiation coupled out for the measurement is focused, after passing through the converging lens and the protective disc, in a light sensor which takes the form of a CCD area sensor. If the refractive power of the converging lens and of the protective disc changes, the size of the focal spot on the sensor changes. Depending on the intensity distribution on the sensor, a traversing motion of the other converging lens is driven, in order to correct the position of the machining point (tool center point, TCP).

A disadvantageous aspect of this known measuring arrangement is that intense retroreflections from the workpiece can likewise, by virtue of repeated retroreflection on the input-side converging lens, get onto the light sensor and thereby falsify the results of measurement. In addition, the measuring device requires a relatively large additional construction space, although it is not capable of registering all the optical elements of the focusing optics.

From DE 10 2011 054 941 B3 a machining head of a laser machining device is known wherein a portion of the laser radiation that is reflected from the last or penultimate optical element of the focusing optics is coupled out of the beam path of the laser radiation via an outcoupling mirror and is focused in an image sensor via a converging lens. If the refractive power of the focusing optics changes as a consequence of heating, the focal point of the reflected laser radiation is also displaced. Since, however, light is also reflected from the workpiece to be machined, it is difficult to detect the weak retroreflection of said optical element among the large number of other reflections.

A deformation of an adaptive mirror with the aid of piezoelectric elements, such as the aforementioned JP H02-204701 A discloses, is, however, relatively complex. In order to compensate the effects of thermally induced deformations in the focusing optics, for this reason adaptive mirrors have gained acceptance which have a mirror substrate that bounds a pressure chamber filled with a fluid, for example air or a liquid. The internal pressure in the pressure chamber can be changed with the aid of a pressure source. The mirror substrate is so thin that it deforms, together with the reflecting coating borne thereby, depending on the internal pressure in the pressure chamber. An example of such an adaptive mirror has been described in WO 2007/000171. The region of the mirror substrate bounding the pressure chamber has a constant thickness there.

However, it has become evident that with adaptive mirrors of such a type the thermally induced changes in the focal spot as regards its axial position and shape can only be compensated inadequately. By virtue of the deformation of the adaptive mirror, the axial position of the focal spot can indeed be kept constant, but large imaging errors have to be accepted. The focal spot is then frequently blurred in the lateral and axial directions in such a way that losses of quality may occur in the course of laser machining.

From DE 39 00 467 A1 an adaptive mirror is known, the mirror substrate of which is not uniformly thick but decreases towards the middle. This apparently spherical decrease in thickness in the middle region of the mirror substrate has as its object an approximation of the deformation of the mirror under pressure to the aspherical, thermally induced deformation of lenses that are used for beam focusing, the diameter thereof being larger than the beam diameter. The mirror substrate has been supported peripherally in a floating bearing (roughly a single-valued bearing), which generally leads to a spherical deformation if the pressure of the fluid is increased.

SUMMARY OF THE INVENTION

It is the object of the invention to specify a laser machining apparatus with which the position and shape of the focal spot can be stabilised better.

In accordance with the invention this object is achieved by a laser machining apparatus that exhibits a laser radiation source for generating laser beams, a machining head and a beam-feeding device which has been arranged in the optical path between the laser radiation source and the machining head. The laser machining apparatus further includes a pressure source and at least one first and one second adaptive mirror, the first and the second adaptive mirror each exhibiting a pressure chamber connected to the pressure source, a mirror substrate preferentially supported by a three-valued bearing, which bounds the pressure chamber, and, where appropriate, a reflecting coating borne by the mirror substrate. An internal pressure in the pressure chamber, in which a fluid, i.e. a liquid, air or another gas, is located, is capable of being changed with the aid of the pressure source in such a way that the mirror substrate with the, where appropriate, reflecting coating borne thereby deforms, depending on the internal pressure in the pressure chamber. In accordance with the invention the mirror substrate of the first adaptive mirror has a thickness which varies at least within a region of the mirror substrate that bounds the pressure chamber. The mirror substrate of the second adaptive mirror, on the other hand, has a thickness which is constant over the entire region over and beyond which the mirror substrate is deformable.

One idea associated with the invention is to compensate the complex thermally induced deformation of the focusing optics with the aid of two different adaptive mirrors in such a way that not only the axial shift of the focal length is compensated but also the majority of the additional thermally induced imaging errors are corrected.

On the assumption that the beam diameter is smaller than the diameter of the focusing optics, the thermally induced deformation of the focusing optics is proportional to the local power density of the laser radiation and further depends on the dimensions of the focusing optics and a few material constants. Since the laser radiation has an approximately Gaussian intensity profile, the deformation of the optical elements contained in the focusing optics also has, in a meridional section, approximately the shape of a Gaussian bell curve.

On the other hand, a mirror substrate that has been supported by a three-valued bearing (i.e. firmly clamped) and has a constant thickness is deformed in the event of a change of pressure in the pressure chamber in such a way that its reflecting surface in meridional section has likewise, at least by approximation, the shape of a Gaussian bell curve.

The invention takes advantage of this in order to stabilise optimally the position and shape of the focal spot of the laser radiation. If the laser radiation, upon impinging onto the second adaptive mirror, has a diameter that has been optimally matched to the size of the deformable region, it can be ensured that, in total, the deformations of the two mirror substrates compensate the thermally induced deformations in the focusing optics, both in temporal respects and in terms of amplitude.

In accordance with the invention the mirror substrate of the first adaptive mirror has a thickness which varies at least within a region of the mirror substrate that bounds the pressure chamber. As a result, the stiffness of the mirror substrate for compensating the torsional moments arising in the case of a three-valued bearing is increased in such a way that the mirror substrate deforms approximately spherically over and beyond a large region.

By virtue of the locally varying thickness of the mirror substrate of the first adaptive mirror, said substrate opposes a change in the internal pressure with a locally differing resistance. Whereas, for example, a plane mirror substrate of constant thickness supported by a single-valued bearing deforms approximately spherically when the internal pressure increases, in the case of adjustment of a varying thickness profile—even in the case of the three-valued bearing of the substrate—arbitrary deformations can be generated within wide limits by a change in the internal pressure. With such deformations the complex imaging errors that are brought about by thermally induced deformations of optical elements in the focusing optics can generally be compensated better than is possible with mirror substrates of constant thickness. The axial position and, above all, also the shape of the focal spot can consequently be stabilised better during operation of the laser machining apparatus.

In the case of a deflection of the laser radiation by 90° the mirror substrate of the first adaptive mirror has an elliptical contour. In this case the region of the mirror substrate of the first adaptive mirror that bounds the pressure chamber should have a thickness profile which is symmetrical to the orthogonal principal axes of the mirror substrate and which has been established in such a manner that in the event of a change in the internal pressure the mirror substrate of the first adaptive mirror deforms spherically in meridional planes that penetrate the principal axes.

The first adaptive mirror has preferentially been arranged in a beam path of the laser radiation at an axial position at which the laser radiation has been collimated. Such conditions frequently obtain in the beam-feeding device if the laser radiation propagates not in an optical fibre but rather in free space.

The second adaptive mirror may exhibit a mirror substrate that, in the event of a change of pressure, deforms aspherically over and beyond a region which is smaller than the region that has been exposed to the laser radiation, but does not deform outside this region. The deformable region of the mirror substrate may, for example, have been 'embedded' in a thicker plane mirror which can be regarded as non-deformable. In this case the pressure chamber may be situated below such a plane mirror or only below the deformable region of the mirror substrate. As in the case of the first adaptive mirror, the deformation can be established by suitable dimensions, depending on the internal pressures arising.

The two adaptive mirrors may be driven temporally in succession in such a way that the first adaptive mirror compensates only the slowly arising changes in the optical action of the focusing optics. These slowly arising changes have their origin in the fact that the heat that arises as a result of partial absorption of the laser radiation in the optical elements of the focusing optics discharges comparatively slowly into the marginal regions of the optical elements.

If in the case of the optical elements it is a question of lenses, then during operation of the laser machining apparatus a temperature distribution forms therein as a result of partial absorption of the laser radiation, in the case of which the temperature is highest on the optical axis and decreases in the radial direction towards the lens rim. The lens consequently heats up, albeit more weakly, also outside the region that is passed through by the laser radiation, since the heat generated there discharges towards the rim of the lens. As a consequence of the relatively complicated temperature distribution, the lens generally deforms not spherically but aspherically, the deformation being greatest in the middle of the lens. These considerations apply correspondingly to mirrors.

The deformation of the mirror substrate of the first adaptive mirror remains approximately spherical as a consequence of its thickness profile and hence corresponds to the slight deformation, induced thermally by conduction of heat, of the focusing optics in their marginal region which has not been exposed to the laser radiation.

The second adaptive mirror, the mirror substrate of which has a constant thickness, may undertake, to a certain extent, the base load of the compensation. The mirror substrate may be plane, concave or convex in the state of rest. For the purpose of compensating the thermally induced deformation of the focusing optics (corresponds to a convex aspherical deformation), the focal length of the mirror substrate has to be lengthened.

In order to be able to drive the two adaptive mirrors, it is favourable if the laser machining apparatus exhibits a measuring device for measuring changes in the focal length of focusing optics contained in the machining head. The measuring device has been set up to direct a first measuring-light bundle and a second measuring-light bundle onto differing regions of an optical surface of the focusing optics, and to evaluate them independently of one another. The regions onto which the measuring-light bundles are directed may in this case have counterparts in the two adaptive mirrors. Given suitable choice of the regions on the optical surface of the focusing optics, a very simple drive of the adaptive mirrors can be achieved, by an adaptive mirror being assigned to each measuring-light bundle. In the simplest case, the measuring signals corresponding to a measuring-light bundle are converted directly, via a simple (where appropriate, even linear) relationship, into control signals for the adaptive mirror in question.

In particular, the second measuring-light bundle can be directed onto a central region of the optical surface that contains the optical axis of the focusing optics, and the first measuring-light bundle can be directed onto a marginal region of the optical surface surrounding the central region preferentially in annular manner. The assignment, already described above, of the marginal region to the profiled mirror substrate of the first adaptive mirror, and of the central region to the constantly thick mirror substrate of the second adaptive mirror, takes into account the temperature distribution and hence the deformation that arises in the optical elements of the focusing optics after some time during operation of the laser machining apparatus.

In one embodiment an evaluating device of the measuring device has been set up to establish, on the basis of measured values that were obtained exclusively by using the first measuring-light bundle, a control signal for the first adaptive mirror in such a way that if the first adaptive mirror is driven with the control signal the first adaptive mirror at least partly compensates a change in the focal length of the focusing optics measured by the measuring device. In addition, the evaluating device has been set up to establish, on the basis of measured values that were obtained exclusively by using the second measuring-light bundle, a control signal for the second adaptive mirror in such a way that if the second adaptive mirror is driven with the control signal the second adaptive mirror at least partly compensates a change in the focal length of the focusing optics measured by the measuring device. In this way, the aforementioned separate drive of the adaptive mirrors via control signals that were obtained exclusively by using one of the two measuring-light bundles is realised.

Subject of the invention is also a process for compensating displacements of a focal spot in a laser machining apparatus, comprising following steps:
a) directing a first measuring-light bundle onto a first region of an optical surface which is contained in focusing optics of the laser machining apparatus;
b) detecting the first measuring-light bundle after it was refracted or reflected at least once by the optical surface;
c) generating a first measuring signal depending on a measuring result obtained in step b);
d) directing a second measuring-light bundle onto a second region of the optical surface that differs from the first region;
e) detecting the second measuring-light bundle after it was refracted or reflected at least once by the optical surface;
f) generating a second measuring signal depending on a measuring result obtained in step e);
g) providing a first adaptive mirror;
h) providing a second adaptive mirror;
i) driving the first adaptive mirror exclusively on the basis of the first measuring signal;
j) driving the second adaptive mirror exclusively on the basis of the second measuring signal.

BRIEF DESCRIPTION OF THE DRAWINGS

Further features and advantages of the invention will become apparent from the following description of the embodiments with reference to the drawings, in which.

DESCRIPTION OF PREFERRED EMBODIMENTS

Figure 1:
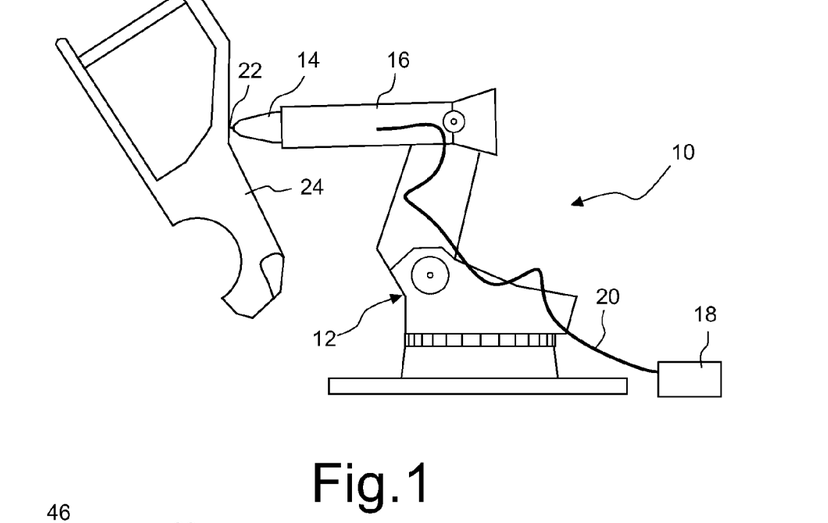
FIG. 1 is a schematic side view of a laser machining apparatus according to the invention.

FIG. 1 shows, in a side view, a laser machining apparatus 10 with a robot 12 and with a machining head 14 according to the invention, which has been fastened to a mobile arm 16 of the robot 12.

The laser machining apparatus 10 includes, in addition, a laser radiation source 18, which in the embodiment that is represented takes the form of a Nd:YAG laser, disk laser or fibre laser. The laser radiation generated by the laser radiation source 18 is fed via an optical fibre 20 to the machining head 14 and is focused by the latter in a focal spot 22. The arm 16 of the robot 12 is positioned in relation to a workpiece 24 in such a way that the focal spot 22 is located at the desired location on the workpiece 24 and the latter can be machined by welding, severing, or in another way.

Of course, other lasers also enter into consideration by way of laser radiation source 18, for example $CO_2$ lasers, the radiation of which, however, is generally fed to the machining head 14 not via optical fibres but with the aid of mirrors.

Figure 2:
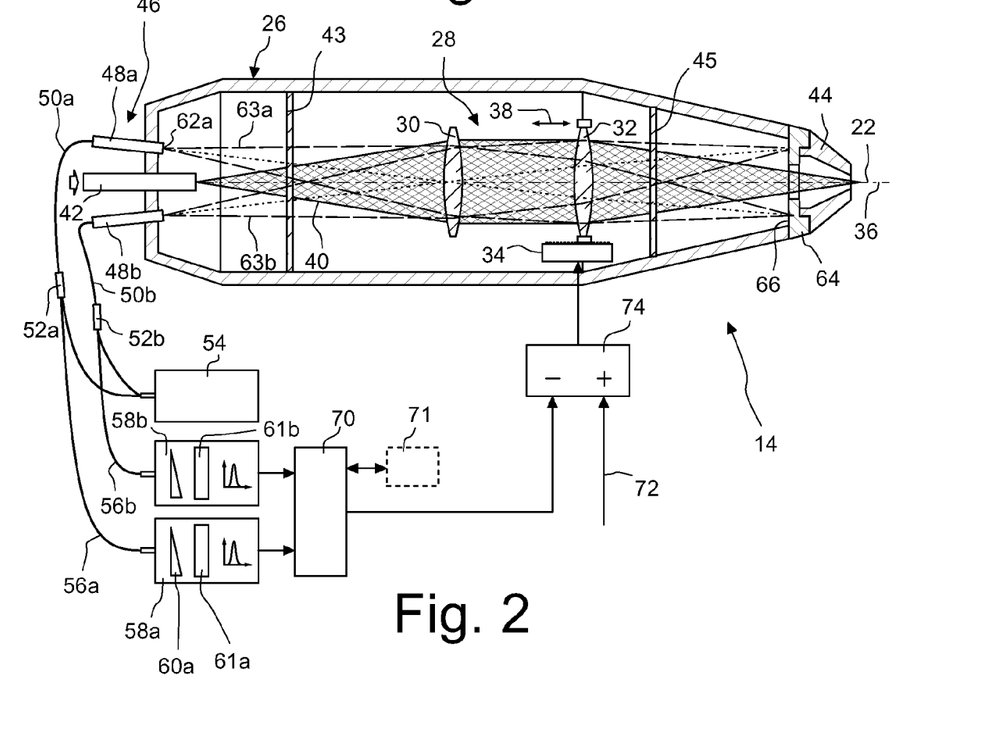
FIG. 2 is a meridional section through a machining head of the laser machining apparatus shown in FIG. 1.

FIG. 2 shows the machining head 14 according to the invention schematically in a meridional section. In a housing 26 of the machining head 14 focusing optics 28 have been arranged which in the embodiment that is represented comprise a first lens 30 and a second lens 32. The first lens 30 has been arranged, in the embodiment that is represented, to be fixed with respect to the housing, in a manner not represented in any detail. The second lens 32 is traversable along an optical axis 36 of the focusing optics 28 with the aid of an adjusting drive 34, as has been indicated in FIG. 2 by a double-headed arrow 38. The focusing optics 28 serve to focus laser radiation 40, which emerges from a laser-radiation fibre plug 42, at the focal spot 22. The axial position of the focal spot 22 may in this case be changed by traversing of the second lens 32. The focal spot 22 in this case always lies outside an interchangeable tip 44 of the housing 26.

The two lenses 30, 32 have been manufactured from a material that is highly transparent to the laser radiation 40. Nevertheless, a portion (albeit small) of the laser radiation 40 is absorbed by the lenses 30, 32, as a result of which the latter heat up. The heating leads, on the one hand, to a change in the refractive index of the lens material and, on the other hand, to a thermal expansion of the lenses 30, 32. Since, in general, the refractive index increases with the temperature (dn/dT >0), and the lenses 30, 32 are converging lenses, in the event of a heating an increase in the refractive power occurs. In the case of lens materials with dn/dT <0, or in the case of focusing optics that combine materials having dn/dT >0 and dn/dT <0, the invention can likewise be employed. By virtue of the real-time measurement, in the last-mentioned case the fact is also taken into account that the thermal conductivity and hence the temporal progression of the thermally conditioned deformation of the materials with dn/dT <0 differ greatly from the values of the materials with dn/dT >0.

If, after commencement of machining operation, the lenses 30, 32 firstly still have the ambient temperature and are then rapidly (typically, within seconds up to a few minutes) heated by the laser radiation 40, for this reason the focal spot 22 is displaced towards the machining head 14. The focal spot 22 may in this case travel a distance of several millimetres. After some time a steady temperature distribution arises in the lenses 30, 32, so that the focal spot 22 remains approximately stationary. But any interruption of the laser machining leads at once again to a different temperature distribution in the lenses 30, 32, and for this reason has an effect on the axial position of the focal spot 22.

In addition to the axial displacement of the focal spot 22, the shape and lateral expansion thereof may also change if the lenses 30, 32 heat up. This is caused by temperature-induced imaging errors which are brought about by the lenses 30, 32. Above all when the heating of the lenses 30, 32 by the laser radiation 40 is uneven, the refracting surfaces of the lenses 30, 32 lose their mostly spherical shape, resulting, as a rule, in imaging errors.

The focusing optics 28 include, in addition, two plane-parallel protective discs 43, 45 which, in a manner not represented in any detail, have been arranged in the beam path of the laser radiation 40 in such a way that they can be exchanged without disassembly of the machining head 10. The protective discs 43, 45 are also partly heated by the laser radiation 40, with the consequence that they act on the laser radiation 40 like converging lenses. Consequently the protective discs 43, 45 also contribute to a thermally induced displacement of the focal spot 22.

This effect is particularly great if the protective discs 43, 45 have been contaminated, because the absorption of the laser radiation 40 then increases considerably. A more severe contamination may in this case lead, in an extremely short time, to the thermal destruction of the protective discs 43, 45. Particularly susceptible to a contamination in this case is the protective disc 45 situated closer to the focal spot, since it has been exposed to splashes of material or smoke arising at the machining point.

In order to be able to detect a displacement of the focal spot 22 and/or changes in its lateral dimensions in good time, in the machining head 14 a measuring device denoted overall by 46 has been integrated, whereby individual parts of the measuring device may also be located outside the housing 26. The measuring device 46 includes a first measuring-light fibre plug 48a, the axis of which has been arranged at an angle with respect to the optical axis 36 of the focusing optics 28, i.e. not parallel. The first measuring-light fibre plug 48a has been connected to a measuring-light source 54 via a first optical waveguide 50a and a first fibre coupler 52a. By the first fibre coupler 52a the first measuring-light fibre plug 48a has been connected via a further optical waveguide 56a to a spectrograph 58a. The latter contains a dispersing optical element, for example a prism 60a or a grating, and a light sensor 61a that is position-resolving in one direction.

In the case of the measuring-light source 54 it is a question of a broadband light source which generates polychromatic light. This measuring light reaches, via the first optical waveguide 50a, the first measuring-light fibre plug 48a and emerges there at an exit window 62a of the first measuring-light fibre plug 48a. The measuring light, which has been indicated in FIG. 2 by 63a, then propagates divergently along the direction predetermined by the axis of the measuring-light fibre plug 48a and in the process penetrates the two lenses 30, 32. On an annular internal surface, designated in the following as reflecting surface 66, of an assembly ring 64 pertaining to the housing 26 the measuring light 63a is reflected and again passes through the lenses 30, 32, but now in reverse sequence. The position of the exit window 62a in the housing 26 has been established in this case in such a way that it is located at an optically conjugate position relative to the reflecting surface 66. The exit window 62a is consequently imaged by the lenses 30, 32 onto the reflecting surface 66, and conversely.

For this reason the measuring light 63a emerging from the exit window 62a enters again, in part, the exit window 62a of the measuring device 46. Via the first fibre coupler 52a at least this reflected portion of the measuring light 63a reaches the first spectrograph 58a which registers the intensity of the reflected measuring light in wavelength-dependent manner. The first spectrograph 58a in this case is insensitive to laser radiation 40 that as a consequence of multiple reflections on optical surfaces has got into the beam path of the measuring light 63a.

The two lenses 30, 32 generate a chromatic longitudinal aberration by reason of the dispersion of material. The focal length of the focusing optics 28 depends for this reason on the wavelength of the measuring light. Since the measuring light is polychromatic, consequently an individual focal spot, to which all wavelengths contribute, does not arise on the reflecting surface 66. Merely the light of a single wavelength is focused precisely onto the reflecting surface 66, and for this reason gets back again, for the most part, to the exit window 62a.

Figure 3:
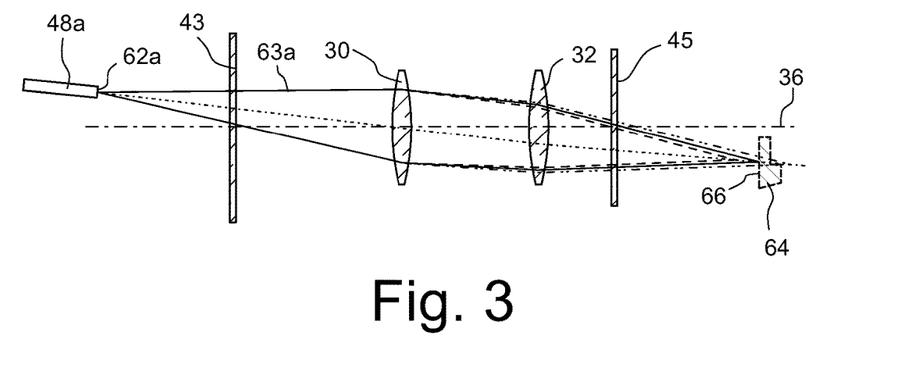
FIG. 3 shows a detail from the machining head shown in FIG. 2 in the cold state.

This has been illustrated in FIG. 3, which shows a detail from FIG. 2. Represented are merely the two lenses 30, 32, the protective discs 43, 45, the first measuring-light fibre plug 48a with the exit window 62a, and also a part of the assembly ring 64 with the reflecting surface 66. Light of varying wavelength has been represented in FIG. 3 by differing broken lines. If the image of the exit window 62a, which is generated by light of one wavelength, does not lie exactly on the reflecting surface 66, only relatively little light gets back into the exit window 62a. Merely the light, indicated by a continuous line, of a single wavelength is, for the most part, reflected back into the exit window 62a of the first measuring-light fibre plug 48a. If the reflecting surface 66 has been oriented to be perpendicular to the axis of the measuring-light fibre plug 48a, the proportion of the measuring light reflected back into the exit window 62a increases, having a favourable effect on the measuring accuracy.

Figure 4:
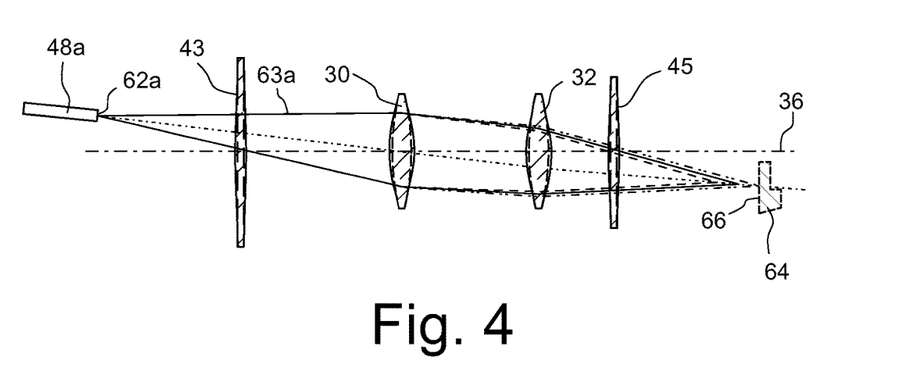
FIG. 4 shows the detail shown in FIG. 3 in the heated state.

The structure of the measuring device 46 consequently corresponds, in principle, to that of a confocal chromatic spacing-measuring device such as is known, for example, from a paper by C. Dietz and M. Jurca entitled *Eine Alternative zum Laser*, Sensormagazin No. 4, 3 Nov. 1997, pages 15 to 18. The wavelength at which a maximum is registered in the first spectrograph 58a has been assigned in an evaluating device 70 of the measuring device 46 to a certain spacing between the exit window 62a and the reflecting surface 66 via the resulting focal length of the focusing optics 28. If the lenses 30, 32 and the protective discs 43, 45 are heated and expand as a result, as has been indicated in FIG. 4, the focal length shortens not only for the focal spot 22 generated by the laser radiation 40 but also for the measuring light 63a, as can be discerned in FIG. 4. As a consequence of this shortening of the focal length, the image of the exit window 62a, which is generated by another wavelength and in the 'cold' state of the focusing optics 28 was still situated outside the reflecting surface 66, now lies on the reflecting surface 66, as a comparison with FIG. 3 shows.

For this reason the first spectrograph 58a registers a maximal retroreflection intensity at a different wavelength from that previously. For this reason, wavelengths for which a maximum is registered have been assigned in the evaluating device 70 to a refractive power of the focusing optics 28. If this refractive power changes as a consequence of a heating of the lenses 30, 32 and of the protective discs 43, 45, this can be detected at once from a shift of the maximum in the spectrum of the measuring light 63a received by the first spectrograph 58a.

The evaluating device 70 compares the focal length corresponding to a certain refractive power of the focusing optics 28 with a set value 72 which is supplied to a control unit 74 for the adjusting drive 34 (cf. FIG. 2). If the measuring device 46 establishes that the focal length of the focusing optics 28 has shortened as a consequence of its heating, the adjusting drive 34 is driven in such a way that the second lens 32 is traversed along the optical axis 36 in the direction of the tip 44, as a result of which the temperature-induced shortening of the focal length is compensated. In the case of the measuring device 46 shown in FIG. 2 the measuring light 63a passes through all the optical elements of the focusing optics.

In the embodiment that is represented, the measuring device 46 further includes a second measuring-light fibre plug 48b, a second optical waveguide 50b, a second fibre coupler 52b, a second optical waveguide 56b and also a second spectrograph 58b, which has likewise been connected to the evaluating device 70. The second measuring-light fibre plug 48b has been arranged in the same meridional plane as the first measuring-light fibre plug 48a, but symmetrically opposite the latter. The arrangement of the two fibre plugs 48a, 48b may in this case have been chosen in such a way that the respectively emerging measuring light penetrates differing regions of the lenses 30, 32, in which case they do not have to lie in the same meridional plane. As a result, items of information are obtained, independently of one another, about changes in refractive power in differing regions of the lenses 30, 32 and of the protective discs 43, 45. As will be elucidated further below with reference to FIG. 13, these items of information obtained independently of one another can be processed further separately, in order thereby to deform differing regions of one or more adaptive mirrors or other optical compensating elements. Each region on the compensating element(s) then corresponds to a region on the lenses 30, 32.

In the embodiment that is represented, the measuring-light source 54 supplies both subsystems jointly with measuring light. Of course, each subsystem may also have its own source of measuring light.

2. Alternative Embodiments

In the following, alternative embodiments will be elucidated with reference to FIGS. 5 to 13.

a) Differing Measuring Regions

Figure 5:
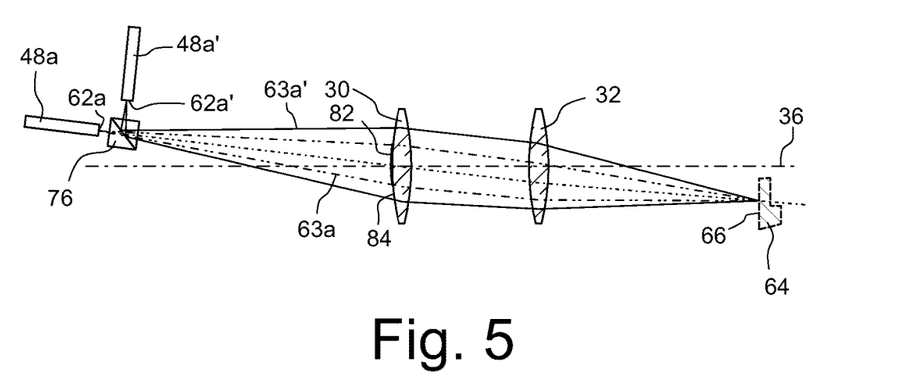
FIG. 5 shows a detail, corresponding to FIG. 3, through a machining head according to another embodiment, wherein differing regions of the lenses are gauged separately from one another.

In the embodiment shown in FIG. 5 the first subsystem comprises, for its part, two separate measuring systems with which differing regions on the lenses 30, 32 can be gauged. In addition to the first measuring-light fibre plug 48a, a further fibre plug 48a' has been provided, from which the measuring light 63a' likewise emerges which is coupled into the beam path of the measuring light via a beam-splitter cube 76.

Figure 6:
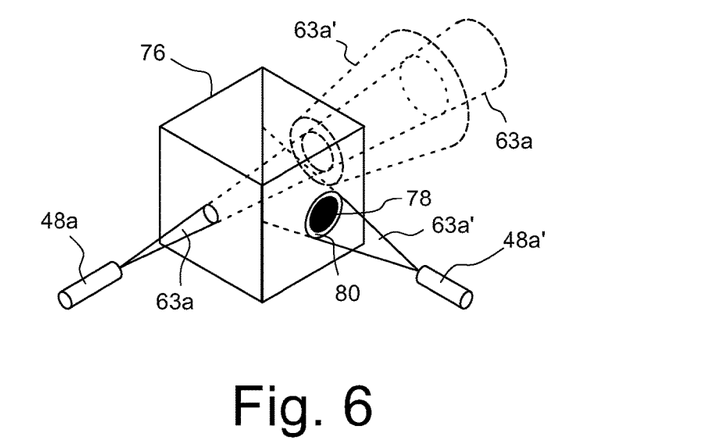
FIG. 6 shows an enlarged detail from a beam-splitter cube of the measuring device shown in FIG. 5.

FIG. 6 shows the beam-splitter cube 76 with the measuring-light fibre plugs 48a, 48a' in an enlarged perspective arrangement. It will be discerned that the measuring light 63a emerging from the first measuring-light fibre plug 48a has a smaller numerical aperture than the measuring light 63a' which emerges from the further measuring-light fibre plug 48a'. On one side surface of the beam-splitter cube 76 a light-absorbing diaphragm 78 has been applied which has a circular shape. The diaphragm 78 in this case covers an inner region of the surface which on this side of the beam-splitter cube 76 is illuminated with the measuring light 63a'. Consequently, on this side of the beam-splitter cube 76 the measuring light 63a' penetrates only an annular region 80.

The numerical aperture of the measuring light 63a emerging from the measuring-light fibre plug 48a has been established in such a way that in the first and second measuring light 63a, 63a' emerging from the beam-splitter cube 76, which in FIG. 6 has been indicated in dashed manner, the measuring light 63a illuminates an inner region, and the measuring light 63a' illuminates a region that surrounds the inner region in annular manner. As can be discerned in FIG. 5, the measuring light 63a and the measuring light 63a' then penetrate differing regions on the lenses 30, 32, namely a central region 82 and, respectively, an annular region 84 surrounding the central region in annular manner.

Spectrographs that spectrally evaluate the light reflected into the measuring-light fibre plugs 48a, 48a' consequently register changes in refractive power of the lenses 30, 32 individually for the regions 82, 84 which are respectively passed through by the measuring light 63a and 63a'.

Of course, the other subsystem of the measuring device 46 shown in FIG. 2 may also include two measuring-light fibre plugs 48b, 48b', in order, there too, to be able to gauge differing regions on the lenses 30, 32 individually.

b) Autocollimator

Figure 7:
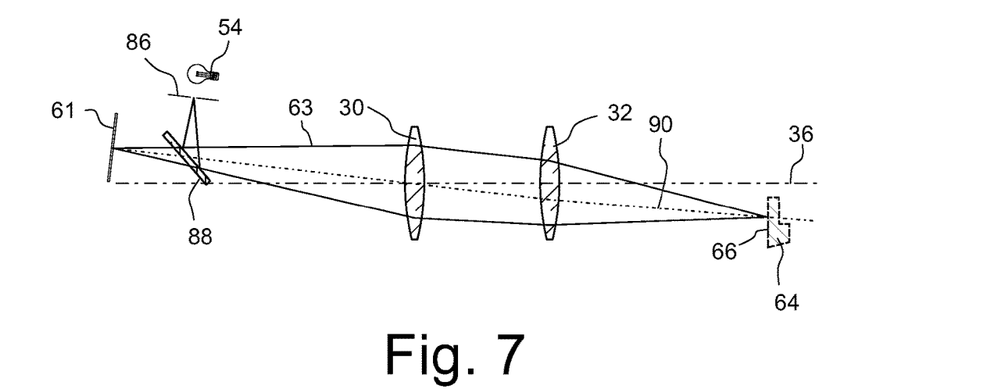
FIG. 7 shows detail, corresponding to FIG. 3, through a machining head according to another embodiment, wherein the measuring device takes the form of an autocollimator.

In the embodiment shown in FIG. 7 the measuring device 46 takes the form of an autocollimator. A measuring-light source 54 generates here, by illuminating a diaphragm 86 with two crossed slits, a cruciform pattern of light which via an incoupling mirror 88 is imaged onto the reflecting surface 66. By virtue of reflection on the reflecting surface 66, the image 89, shown in FIG. 9, of the diaphragm 86 arises on a position-resolving image sensor 61 which, for example, may take the form of a CCD sensor. The location of the image on the image sensor 61 depends in this case on the angle between the reflecting surface 66 and the axis 90 of the measuring light 63. Also in this embodiment, the measuring light consequently passes through the two lenses 30, 32 twice before it is registered by the light sensor 61.

Figure 8:
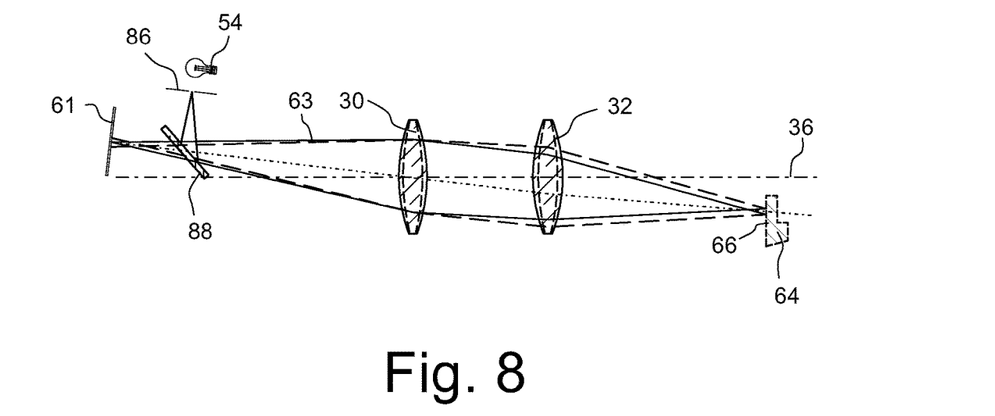
FIG. 8 shows the measuring device shown in FIG. 7 after heating of the lenses.
Figure 9:
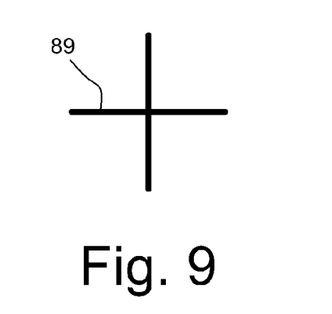
FIGS. 9 and 10 show the image of a pattern of light on an image sensor of the autocollimator for the shown in FIG. 7 in the cold state and in the heated state, respectively.
Figure 10:
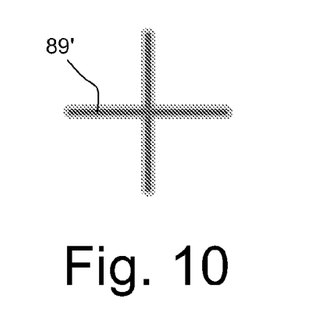
Figure 11:
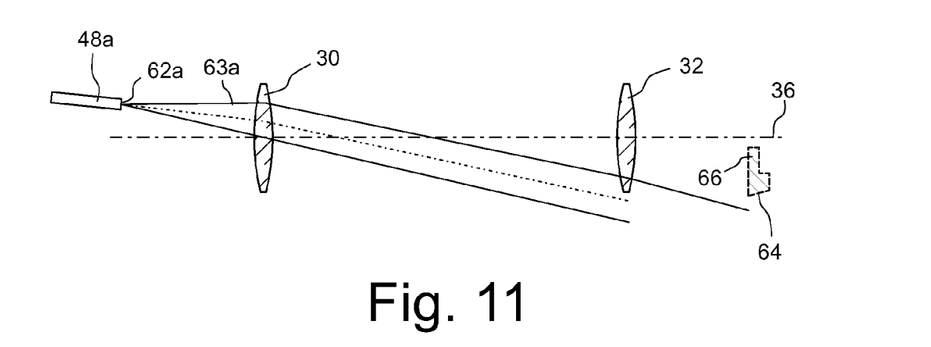
FIG. 11 shows a detail, corresponding to FIG. 3, through a machining head according to another embodiment, wherein the lenses in the machining head are far away from one another.

If the lenses 30, 32 (and the protective discs which are not represented) expand as a consequence of heating, as FIG. 8 illustrates, the focal length of the focusing optics 28 changes. The image 89' of the diaphragm 86 on the image sensor 61 becomes unsharp as a result, as FIG. 10 illustrates. With the aid of a contrast measurement of the image 89', it is possible to register quantitatively how the refracting action of the lenses 30, 32 changes as a consequence of the heating.

c) Separate Gauging

Figure 12:
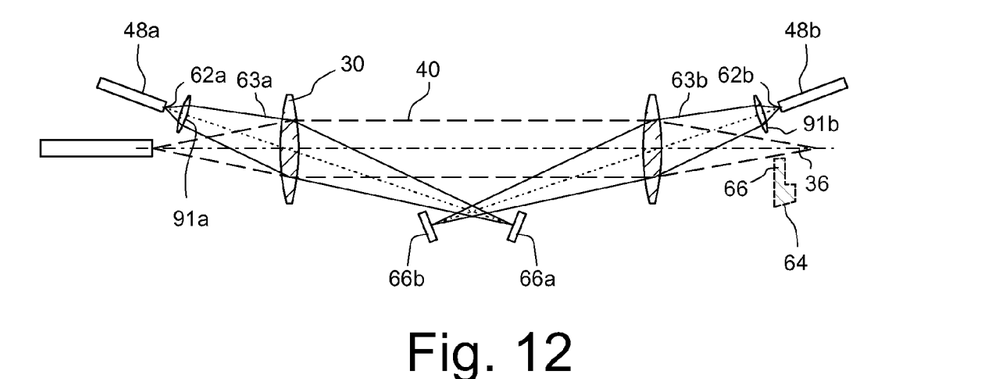
FIG. 12 is a representation corresponding to FIG. 10, wherein each lens is gauged by its own measuring device.

Particularly if the lenses 30, 32 have been spaced a long way from one another, the case illustrated in FIG. 12 may arise, namely that for reasons of construction space the measuring light 63a emerging from the exit window 62a cannot pass through both lenses 30, 32 in such a way that it is reflected again from the reflecting surface 66 back into the exit window 62a.

In this case the arrangement shown in FIG. 12 may find application, in which to each of the two lenses 30, 32 a specific measuring-light fibre plug 48a and 48b, respectively, and a specific reflecting surface 66a and 66b, respectively, have been assigned. The reflecting surfaces 66a, 66b are formed in this embodiment by additional mirrors which have been arranged to be fixed with respect to the housing. The mirrors are plane and have been oriented to be perpendicular to an optical axis, indicated in dashed manner in FIG. 12, of the respective measuring light 63a or 63b.

In order to diminish the divergence of the measuring light 63a, 63b emerging from the measuring-light fibre plug 48a, 48b, in the beam path of the measuring light there is located a converging lens 91a and 91b, respectively. The converging lenses 91a, 91b have not been exposed to the laser radiation 40 but contribute to the imaging of the light-exit windows 62a, 62b onto the reflecting surfaces 66a, 66b.

d) Determination of the Degree of Contamination

To the evaluating device 70 of the embodiment shown in FIG. 2 a memory 71 indicated in dashed manner may have been assigned, in which, each time the device is put into operation, the changes in the focal length of the focusing optics 28 (or values that are linked to the focal length) are stored at several points in time. The evaluating device 70 can then compare the values for the focal length obtained during an actual measurement with the stored values and can deduce therefrom whether the degree of contamination of the protective discs 43, 45 has increased, or the latter have even been destroyed. An increase in the degree of contamination becomes noticeable through a distinctly faster shortening of the focal length under otherwise identical operating conditions. A destruction, on the other hand, may be detected from an abrupt increase in the focal length, because then the focusing action of the protective discs 43, 45 occurring in the event of thermal loading suddenly decreases.

e) Compensation of the Focal-spot Displacement

In order to compensate displacements of the focal spot 22, there is also the possibility of relocating optical elements outside the machining head 14 in such a way that the position and size of the focal spot 22 remain constant also in the event of a heating of the lenses 30, 32.

Figure 13:
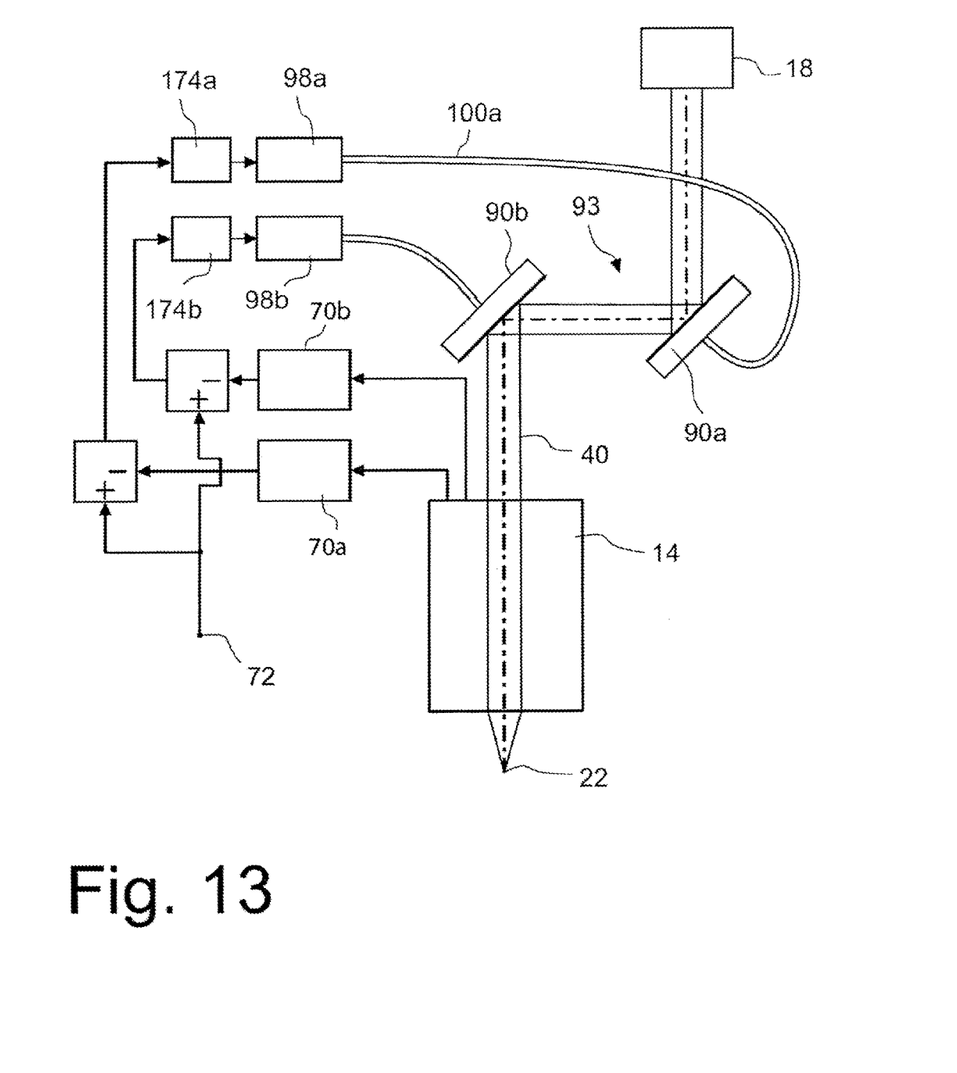
FIG. 13 is a diagrammatic sketch for elucidating how, on the basis of the measured changes in the focal length of the lenses in the machining head, adaptive mirrors in a beam-feeding device are driven.
Figure 14:
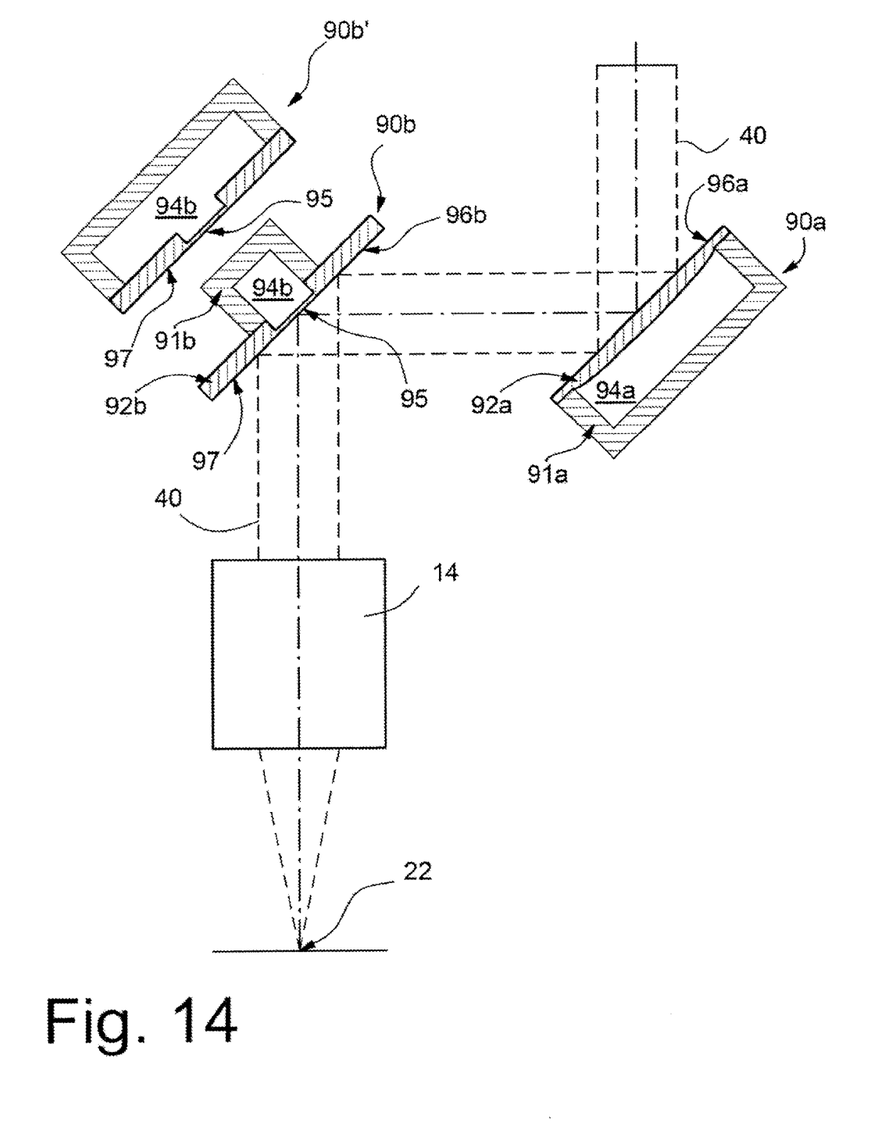
FIG. 14 shows a detail from the diagrammatic sketch of FIG. 13, in which the structure of two adaptive mirrors can be discerned.

FIG. 13 shows a set-up in which the laser radiation 40 is fed in free space to the machining head 14 as a collimated beam via a beam-feeding device 93 which includes two adaptive deflecting mirrors 90a, 90b shown schematically in FIG. 14 in a meridional section.

The first adaptive mirror 90a includes a mirror substrate 92a supported by a three-valued bearing in a housing 91a, which adjoins a pressure chamber 94a and, for example, may consist of glass or copper. The mirror substrate 92a bears a reflecting coating 96a which, as a rule, comprises a plurality of thin individual layers. The pressure chamber 94a of the first adaptive mirror 90a has been connected to a pressure source 98a (see FIG. 13) via a pressure line 100a. If the internal pressure in the pressure chamber 94a is changed with the aid of the pressure source 98a, the mirror substrate 92a with the reflecting coating 96a borne thereby deforms.

Of course, the changes in the radii of curvature of the adaptive mirrors 90a and 90b can also be registered with the measuring process described above. However, since the mirrors cause no chromatic error, in this case the path of the measuring beam has to contain additional optical components that exhibit a chromatic error (without imaging).

As shown in FIG. 14, the mirror substrate 92a of the first adaptive mirror 90a has a thickness which varies at least within a region of the mirror substrate that bounds the pressure chamber 94a. As a result, torsional moments are compensated which arise by reason of the three-valued bearing of the mirror substrate 92a. The mirror substrate 92a has an elliptical contour in the case of the beam deflection by 90° which is represented. Accordingly, the thickness profile of the mirror substrate 92a also has a three-dimensional and non-rotationally symmetrical shape which may be approximated to an ellipsoid. As a result, in the event of an increase in pressure the mirror substrate 92a deforms approximately spherically in meridional sections that contain the principal axes of the ellipsoid.

The mirror substrate 92a has a plane external surface in the case of an elevated internal pressure in the pressure chamber 94a. If the internal pressure in the pressure chamber 94a drops to the ambient pressure (normal pressure), the mirror substrate 92a deforms in spherically concave manner. If with the aid of the pressure source 98a the internal pressure in the pressure chamber 94a meanwhile increases further, then the mirror substrate 92a with the reflecting coating 96a borne thereby deforms spherically to the greatest possible extent up to the maximally permissible pressure value, at which the deformation assumes the maximally attainable convex value. Through the targeted deformation of the mirror substrate 92a and consequently also change of the focal length of the adaptive mirror 90a, the thermally induced shortening of the focal length of the following focusing optics 28 can be partly compensated.

The second adaptive mirror 90b has, in principle, been constructed exactly like the first adaptive mirror 90a, i.e. has likewise been supported by a three-valued bearing. In contrast to the first adaptive mirror 90a, the mirror substrate 92b of the second adaptive mirror 90b has a thickness which is constant within a deformable central region 95 of the mirror substrate 92b that has been covered by the coating 96b and bounds the pressure chamber 94b. The deformable region 95 of the mirror substrate 92b is smaller than the elliptical region which has been exposed to the laser radiation 40. In the case of an alternative configuration of the second adaptive mirror 90b', which has been represented in FIG. 14 behind the mirror 90b, the pressure chamber 94b also adjoins the thicker marginal region 97 which surrounds the deformable central region 95 and is not deformable.

Ordinarily the diameter of the laser radiation 40 is smaller than the diameter of the focusing optics 28. As a result, in profile in a meridional section the thermally induced deformation of the focusing optics 28 has the shape of a Gaussian bell curve. In the embodiment that is represented, this deformation corresponds to the shape of the deformation of the mirror substrate 92b of the second adaptive mirror 90b in the central region 95, in which the mirror substrate 92b is deformable. In the surrounding marginal region 97 the mirror substrate 92b is not deformable and for this reason also in the event of a change of pressure in the pressure chamber 94b always acts like a plane mirror.

The regions of the focusing optics 28 not exposed to the laser radiation 40 are, however, likewise heated as a consequence of conduction of heat, and deform. This heating occurs in temporally offset manner on account of the sluggishness of the conduction of heat. In addition, the deformation there is much smaller than in the middle of the focusing optics 28.

On account of the temporal offset and the slight deformation, the first adaptive mirror 90a is used for compensating this approximately spherical deformation in the marginal region of the focusing optics 28. By superposition of the optical action of both adaptive mirrors 90a, 90b, both spatially and temporally the complex thermally induced deformation of the focusing optics 28 is completely compensated.

The pressure sources 98a and 98b assigned to the adaptive mirrors 90a, 90b are controlled by control units 174a and 174b, respectively, which assume the role of the control unit 74 of the embodiment shown in FIG. 2. If evaluating devices 70a, 70b of the measuring device establish a displacement or some other change in the focal spot 22 in the manner described above, the control units 174a, 174b calculate, by comparison with the corresponding set values 72, a requisite deformation of the mirror substrates 92a, 92b of the adaptive mirrors 90a, 90b. The control units 174a, 174b drive the pressure sources 98a, 98b for this purpose in such a way that the latter generate changes of pressure in the pressure chambers 94a and 94b, respectively, that result in the desired deformations of the mirror substrates 92a, 92b.

Since the first adaptive mirror 90a compensates the deformations of the focusing optics 28 in the marginal region, and the second adaptive mirror 90b, independently thereof, compensates the deformations of the focusing optics 28 in the central region, the adaptive mirrors 90a, 90b can be directly assigned to the measuring light 63a, 63a' which penetrates, respectively, the central region 82 and the marginal region 84, surrounding said central region, of the focusing optics 28.

In this way, measuring signals generated by the first evaluating device 70a, which are obtained by evaluation of the measuring light 63a' penetrating the marginal regions 84 of the focusing optics 28, can be converted directly and, where appropriate, even linearly by the first control device 174a into adjusting commands for the first pressure source 98a.

Accordingly, measuring signals generated by the second evaluating device 70b, which are obtained by evaluation of the measuring light 63a penetrating the central regions 82 of the focusing optics 28, can be converted directly and, where appropriate, even linearly by the second control device 174b into adjusting commands for the second pressure source 98b.

Since the adaptive mirrors 90a, 90b have not been exposed to the measuring light 63a, 63a', the compensating axial displacement of the focal spot 22, which is generated by the deformation of the adaptive mirrors 90a, 90b, cannot be monitored directly by the measuring device 46. For this reason, a control loop cannot be realised with the set-up shown in FIG. 13. Nevertheless, the axial position of the focal spot 22 remains stable during operation of the laser machining apparatus, since the connection between the measuring signals and the control signals can easily be determined by a calibration measurement.

The invention claimed is:

1. A laser machining apparatus, comprising:
   a laser radiation source configured to generate laser radiation,
   a machining head,
   a beam-feeding device arranged in an optical path between the laser radiation source and the machining head, and
   a pressure source,
   the beam-feeding device including a first adaptive mirror and a second adaptive mirror, the first and the second adaptive mirror each comprising
      a pressure chamber connected to the pressure source and
      a mirror substrate bounding the pressure chamber and having a surface that is configured to reflect the laser radiation,
   wherein the pressure source is configured to change an internal pressure in the pressure chamber of each adaptive mirror in such a way that the mirror substrate of the respective adaptive mirror deforms depending on the internal pressure in the pressure chamber, and
   wherein the mirror substrate of the first adaptive mirror has a thickness that varies at least within a region of the mirror substrate, and wherein the mirror substrate of the second adaptive mirror has a thickness that is constant over the entire region in which the mirror substrate is deformable.

2. The laser machining apparatus of claim 1, comprising focusing optics contained in the machining head and a measuring device configured to measure changes in a focal length of the focusing optics, the measuring device is configured
   to direct a first measuring-light bundle and a second measuring-light bundle onto differing regions of an optical surface of the focusing optics and
   to evaluate the first and second measuring-light bundle independently of one another.

3. The laser machining apparatus of claim 2, wherein the measuring device is configured to direct the second measuring-light bundle onto a central region of the optical surface, which contains an optical axis of the focusing optics, and to direct the first measuring-light bundle onto a marginal region of the optical surface surrounding the central region.

4. The laser machining apparatus of claim 2, comprising a computing device configured
   a) to compute, on the basis of measured values that were obtained exclusively by using the first measuring-light bundle, a first internal pressure in such a way that if the first internal pressure is produced by the pressure source in the pressure chamber of the first adaptive mirror, the first adaptive mirror at least partly compensates a change in the focal length of the focusing optics measured by the measuring device, and
   b) to compute, on the basis of measured values that were obtained exclusively by using the second measuring-light bundle, a second internal pressure in such a way that if the second internal pressure is produced by the pressure source in the pressure chamber of the second adaptive mirror, the second adaptive mirror at least partly compensates a change in the focal length of the focusing optics measured by the measuring device.

5. The laser machining apparatus of claim 1, wherein, if the internal pressure in the pressure chamber of the second adaptive mirror changes, the mirror substrate of the second adaptive mirror deforms aspherically in a deformable region which is smaller than a region that is exposed to the laser radiation, and the mirror substrate of the second adaptive mirror does not deform outside the deformable region.

* * * * *